(12) United States Patent
Scherer et al.

(10) Patent No.: US 11,481,007 B2
(45) Date of Patent: Oct. 25, 2022

(54) COMPUTER CASE AND METHOD OF ATTACHING AN EXPANSION CARD TO A COMPUTER CASE

(71) Applicant: Fujitsu Client Computing Limited, Kanagawa (JP)

(72) Inventors: August Scherer, Munich (DE); Lutz Rösler, Munich (DE)

(73) Assignee: Fujitsu Client Computing Limited, Kawasaki (JP)

( * ) Notice: Subject to any disclaimer, the term of this patent is extended or adjusted under 35 U.S.C. 154(b) by 0 days.

(21) Appl. No.: 17/109,453

(22) Filed: Dec. 2, 2020

(65) Prior Publication Data

US 2021/0173454 A1 Jun. 10, 2021

(30) Foreign Application Priority Data

Dec. 5, 2019 (DE) .................... 10 2019 133 248.6

(51) Int. Cl.
*G06F 1/18* (2006.01)

(52) U.S. Cl.
CPC .................................. *G06F 1/186* (2013.01)

(58) Field of Classification Search
CPC ........ G06F 1/186; G06F 1/185; H05K 7/1408
See application file for complete search history.

(56) References Cited

U.S. PATENT DOCUMENTS

| | | | |
|---|---|---|---|
| 6,287,138 B1 | 9/2001 | Kuang | |
| 6,404,651 B1* | 6/2002 | Martin | G06F 1/184 |
| | | | 174/363 |
| 6,480,393 B1 | 11/2002 | Chen | |
| 7,753,458 B2* | 7/2010 | Liang | G06F 1/186 |
| | | | 312/223.2 |
| 2005/0059285 A1 | 3/2005 | Chen et al. | |
| 2007/0167064 A1 | 7/2007 | Shih et al. | |
| 2008/0038953 A1 | 2/2008 | Liang | |
| 2010/0002378 A1 | 1/2010 | Chen et al. | |
| 2012/0049027 A1 | 3/2012 | Chen | |
| 2013/0155602 A1 | 1/2013 | Bernadet et al. | |

FOREIGN PATENT DOCUMENTS

DE        102 09 083 A1    9/2003

OTHER PUBLICATIONS

Great Britain Search Report dated Apr. 9, 2021, counterpart of Great Britain Application No. 2019105.2.

* cited by examiner

*Primary Examiner* — James Wu
(74) *Attorney, Agent, or Firm* — DLA Piper LLP (US)

(57) ABSTRACT

A computer cases includes a rear panel with a slot field and an expansion card with a slot bracket that is fixed laterally to the slot field by a screw. An opening is cut out on the rear panel next to the slot field so that the screw for fixing the expansion card is easily accessible and can be easily mounted with a corresponding tool.

9 Claims, 3 Drawing Sheets

COMPUTER CASE AND METHOD OF ATTACHING AN EXPANSION CARD TO A COMPUTER CASE

TECHNICAL FIELD

This disclosure relates to a computer case comprising a rear panel with a slot field and an expansion card with a slot bracket that is laterally fixed to the slot field by a screw, whereby an opening is cut out on the rear panel next to the slot field.

BACKGROUND

US 2010/0002378 A1 discloses a slot field for expansion cards provided on the rear panel of the case. On the rear panel, a strip is also provided on which a slot bracket of the expansion card can be fixed. The slot bracket protrudes over an opening next to the strip. That opening can be closed with a swivelling safety element. The safety element fixes the slot bracket without screws by snapping it onto the strip.

A similar structure is shown in US 2012/0049027 A1. There too, a slot bracket of an expansion card can be inserted through an opening in the computer case and fixed to a strip provided for this purpose. The opening can be closed with a swivelling safety element. To fix the expansion card, the locking element is screwed to the slot bracket of the expansion card and the strip.

If the slot brackets are fixed with screws, they must be fixed with a suitable tool. In that arrangement, poor accessibility of the screws in or on the computer case makes installation more difficult.

Therefore, it could be helpful to provide a computer case in which a screw that fixes an expansion card to the rear panel of a computer case is easily accessible.

SUMMARY

We provide a computer case including a rear panel with a slot field, and an expansion card with a slot bracket that is fixed laterally to the slot field by a screw, whereby an opening is cut out on the rear panel next to the slot field, and the opening is dimensioned such that the screw that fixes the expansion card is easily accessible and can be easily mounted with a corresponding tool.

We also provide a method of fixing an expansion card to the computer case including a rear panel with a slot field, and an expansion card with a slot bracket that is fixed laterally to the slot field by a screw, whereby an opening is cut out on the rear panel next to the slot field, and the opening is dimensioned such that the screw that fixes the expansion card is easily accessible and can be easily mounted with a corresponding tool, including opening the side cover of the computer case, loosening the screw at the cover, opening the cover, inserting the expansion card with the slot bracket into a slot of the slot field, fixing the slot bracket by screwing it to the strip, closing the cover and pressing the slot bracket against the strip, fixing the cover by screwing it to the computer case, and closing the side cover of the computer case.

Figure 1:
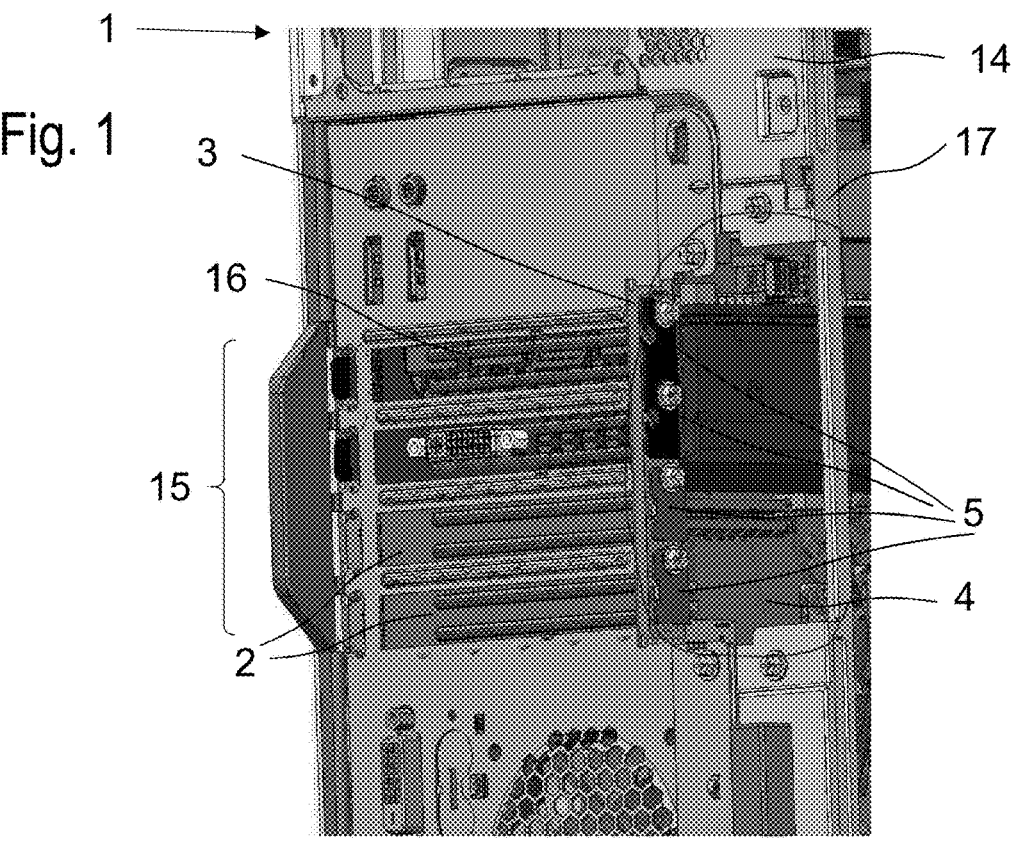
FIG. 1 shows a perspective rear view of the computer case with a slot field for expansion cards and a recessed opening.

REFERENCE SIGNS 1 computer case
2 slot
3 vertical strip on the computer case
4 opening in the computer case
5 slot bracket of the expansion card
6 screw for fixing the expansion card
7 cover
8 swivelling structure
9 catches
10 holes for screw insertion
11 notches
12 screw for fixing the cover
13 side cover of the computer case
14 rear panel
15 slot field
16 expansion card
17 vertically bent section of the rear panel

DETAILED DESCRIPTION

In our computer case, the opening is dimensioned such that the screw that fixes the expansion card is easily accessible and can be easily mounted with an corresponding tool.

To fix the screw, it must be accessible with a suitable tool such as a screwdriver. To make this possible, the described opening is cut out at an appropriate place in the computer case. Thus, the screw is easily accessible.

It is preferred that the opening extends to the side wall of the computer case.

In one example, the rear panel includes a vertically bent section for fixing a side cover. To reach the screw easily, the opening extends into the vertically bent section. Thus, the screw can be reached from this side with a screwdriver, for example, in direct alignment. The screwdriver does not have to be set at an angle.

A strip may be arranged on the rear panel of the computer case between the slot field and the opening, wherein the strip is vertical to the rear panel. The strip may include a hole or a threaded hole so that a slot bracket of the expansion card can be fixed to the strip by screwing it such that the screw head points in the direction of the opening.

To do this, the slot bracket is inserted through the opening into the case and placed on the strip so that respective provided holes are congruent. Such a strip facilitates the accessibility of the screw by its protruding position.

The opening may be closed with a cover. The cover can close the opening in the computer case and may prevent, e.g., penetration of electromagnetic radiation, but also dust into its interior.

Advantageously, the cover snaps into the computer case by a snap lock. To reach the screw when fixing an expansion card, the cover is opened without any further aids. So that the cover can be closed after the expansion card has been fixed in place, one form of the cover can have a notch for the screw with which the expansion card is fixed.

A hole may also be provided in the cover, which can be used to additionally fix the closed cover with a screw.

To further seal the opening, a seal may be attached to the cover. The seal meets the requirements for prevention of electromagnetic interference and electrostatic discharge.

It is advantageous that the cover is designed such that it presses the slot bracket of the expansion card against the computer case when closed. Thus, the expansion card is fixed a second time in addition to the screw connection.

The cover may be partially covered by a side cover of the computer case so that it can only be opened after removing the side cover. This serves as an additional protection of the cover in closed state and prevents the cover from being opened unintentionally.

The cover may be hinged to the edge of the vertical strip facing away from the computer case and can be swivelled around it. The advantage of such an attachment is that the open cover is not hindering when fixing the screw, but can be swivelled to the side opposite the screw head.

Attaching an expansion card to a computer case requires a multi-step procedure. First, the side cover of the computer case is opened. Then, the screw that secures the cover to the case is loosened. The cover can then be opened, e.g., by swivelling. The cover is opened so that the screw head is freely accessible. After opening the cover, the expansion card is inserted into a slot of the slot field. The slot bracket of the expansion card is placed on a suitable place of the computer case, for example, the strip. Then the expansion card is fixed by screwing the slot bracket to the strip. By closing the cover, the slot bracket is additionally pressed against the computer case or ideally the strip. After closing the cover, the computer case is closed again. The cover can also be fixed to the case with a screw. Then, the side cover of the computer case is closed again.

Our computer cases and methods are explained in more detail below in an example based on drawings.

Similar or apparently identical elements in the figures are marked with the same reference sign. The figures and the proportions in the figures are not to scale.

FIG. 1 shows the rear panel 14 of a computer case 1 that contains a slot field 15 with four slots 2 for expansion cards 16. Next to the slots 2 a strip 3 is arranged vertically to the rear panel 14, in which four holes are cut out. On the side of the strip facing away from the slot field 15 there is an opening 4 in the computer case 1. In this example, expansion cards 16 are installed in the two upper slots 2 of the computer case 1. The cards 16 have curved slot brackets 5 protruding from the opening 4 and rest on the strip 3. Each slot bracket 5 is fixed by screwing it to the strip 3.

Figure 2:
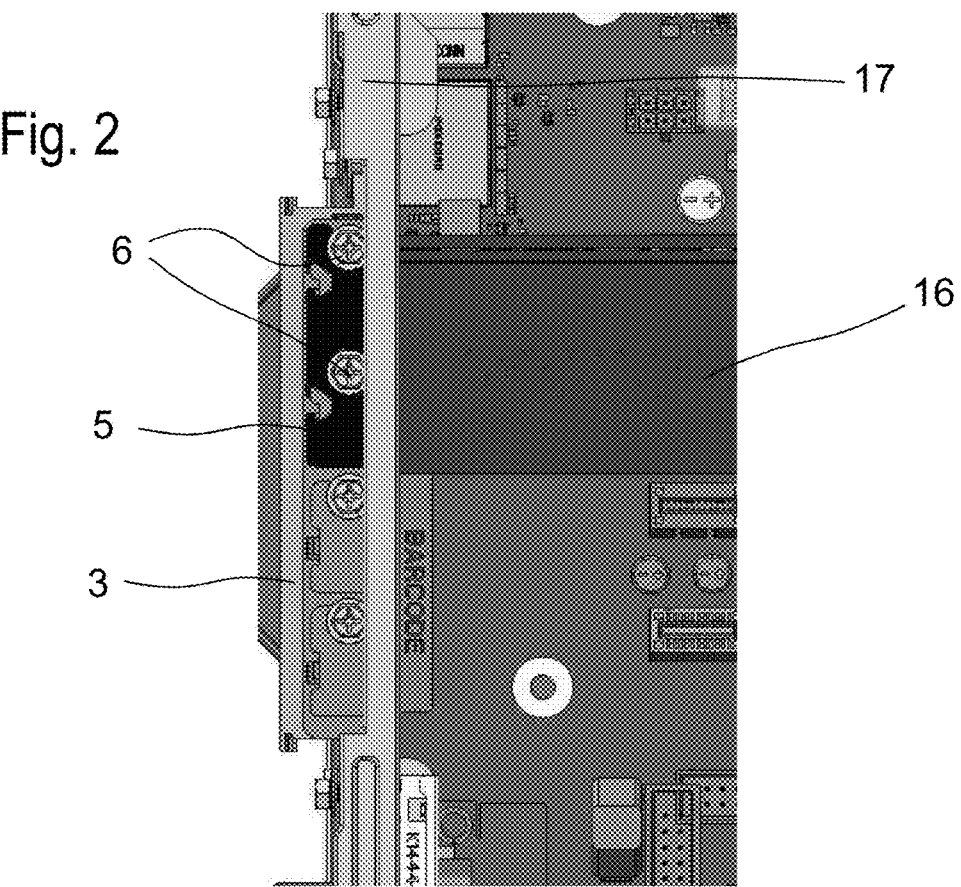
FIG. 2 shows a detailed side view of the strip and the recessed opening in the computer case.

Through the opening 4, which is recessed in a part of the rear panel 14 and a vertically bent section 17 for fixing a side cover 13 of the computer case 1, screws 6 that fix the expansion card 16 are easily accessible for the corresponding screwdriver as illustrated in FIG. 2.

Figure 3:
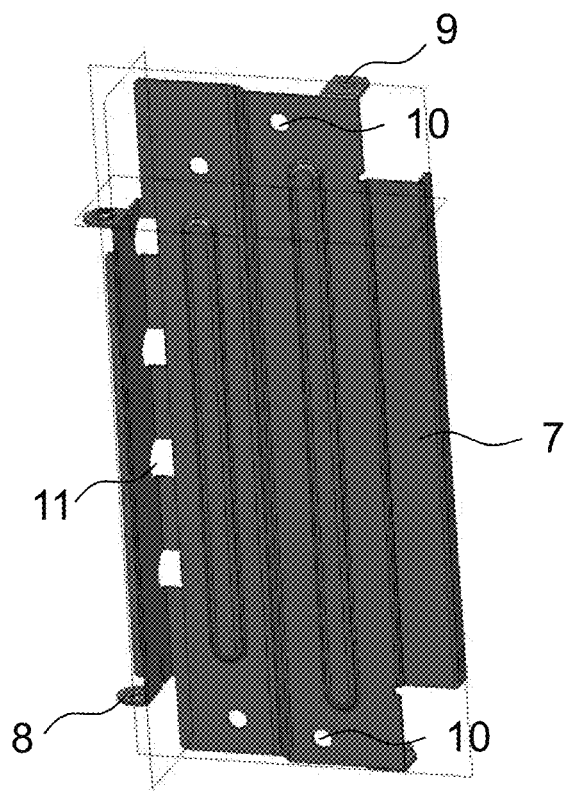
FIG. 3 shows a perspective view of the cover.
Figure 4:
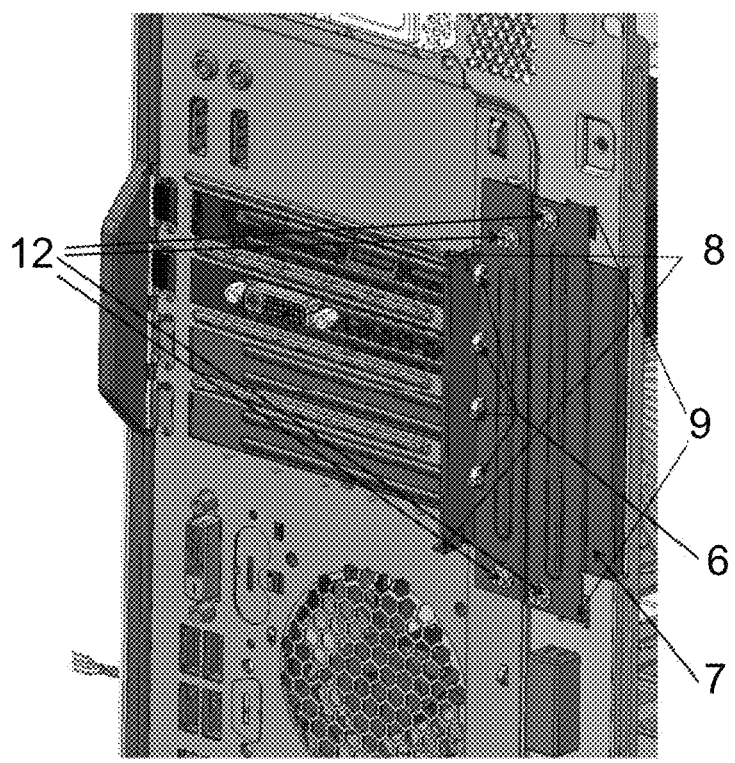
FIG. 4 shows a perspective rear view of the computer case with a slot field for expansion cards and an opening closed with a cover.

A cover 7 in the shape of a flap, as shown in FIG. 3, is available to cover the opening 4. The cover 7 is shaped such that it completely covers the recessed opening 4. It comprises a swivelling structure 8 that allows the cover 7 to be hung on the outer edge of the strip 3 by lugs provided for this purpose. The opening 4 can then be closed by swivelling as shown in FIG. 4. The cover 7 is attached to the computer case 1 when closed by two catches 9. Two holes 10 at the top and two holes 10 at the bottom of the cover 7 additionally allow the cover 7 to be fastened to the computer case 1 by screwing it. Four notches 11 allow the cover 7 to be closed even after the screws 6 that fix the expansion cards 16 have been attached.

Figure 5:
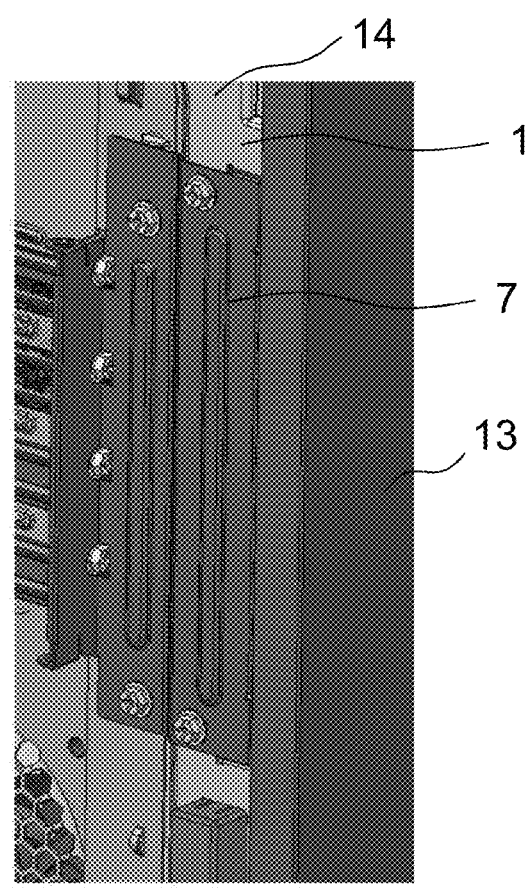
FIG. 5 shows a perspective detailed view of the opening closed with a cover and the side cover.

FIG. 5 shows that a side cover 13 of the computer case 1 partially hides cover 7. To open the cover 7 and easily reach the screws 6, the side cover 13 must first be removed.

The invention claimed is:

1. A computer case comprising:
a rear panel with a slot field, and
an expansion card with a slot bracket that is fixed laterally to the slot field by a screw,
whereby an opening is cut out on the rear panel next to the slot field, a strip is arranged on the rear panel between the slot field and the opening, the strip is vertical to the rear panel and the slot bracket of the expansion card can be fixed on the strip with the screw such that a screw head points in a direction of the opening, the rear panel has a vertically bent section for fixing a side cover, the opening extends into the vertically bent section,
the opening in the vertically bent section is dimensioned such that the screw can be reached through the opening from the side of the vertically bent section with a screwdriver in direct alignment, and
in direct alignment means that the screwdriver does not have to be set at an angle.

2. The computer case according to claim 1, wherein the opening is closed with a cover.

3. The computer case according to claim 2, wherein the cover can be fixed to the computer case by a snap lock.

4. The computer case according to claim 2, wherein a notch for the screw that fixes the expansion card is provided in the cover.

5. The computer case according to claim 2, wherein a hole is provided in the cover for additional fixing of the cover with the screw.

6. The computer case according to claim 2, wherein the cover presses the slot bracket against the computer case when closed.

7. The computer case according to claim 2, wherein the cover is partially covered by the side cover of the computer case and can only be opened after removing the side cover.

8. The computer case according to claim 2, wherein the cover is hinged to an edge of the vertical strip facing away from the computer case and can be opened by swivelling.

9. A method of fixing the expansion card to the computer case according to claim 1, comprising:
opening the side cover of the computer case,
loosening a cover screw at a cover,
opening the cover,
inserting the expansion card with the slot bracket into a slot of the slot field,
fixing the slot bracket by screwing it to the strip,
closing the cover and pressing the slot bracket against the strip,
fixing the cover by screwing it to the computer case, and
closing the side cover of the computer case.

\* \* \* \* \*